(12) United States Patent
Tsutsumi

(10) Patent No.: US 6,791,765 B2
(45) Date of Patent: Sep. 14, 2004

(54) RETROFOCUS WIDE-ANGLE LENS

(75) Inventor: Katsuhisa Tsutsumi, Kawagoe (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/327,912

(22) Filed: Dec. 26, 2002

(65) Prior Publication Data

US 2003/0137750 A1 Jul. 24, 2003

(30) Foreign Application Priority Data

Jan. 17, 2002 (JP) ........................................ 2002-009260

(51) Int. Cl.[7] ............................................. G02C 13/04
(52) U.S. Cl. ...................................... 359/749; 359/753
(58) Field of Search ................................ 359/743–753

(56) References Cited

U.S. PATENT DOCUMENTS

| | | | | |
|---|---|---|---|---|
| 4,957,355 A | * | 9/1990 | Sato ........................... | 359/708 |
| 6,075,657 A | * | 6/2000 | Takada et al. .............. | 359/749 |
| 6,577,455 B2 | * | 6/2003 | Shikama ..................... | 359/753 |

FOREIGN PATENT DOCUMENTS

| JP | 4-118612 | 4/1992 |
|---|---|---|
| JP | 2000-131606 | 5/2000 |

* cited by examiner

*Primary Examiner*—Scott J. Sugarman
(74) *Attorney, Agent, or Firm*—Arnold International; Jon W. Henry; Bruce Y. Arnold

(57) ABSTRACT

A retrofocus wide-angle lens is formed of only three lens groups, in order from the object side, a first lens group of negative refractive power, a second lens group that includes a stop, and a third lens group of positive refractive power. The first lens group is at the object end of the retrofocus wide-angle lens and includes, in order from the object side, a plurality of negative lens components and a plurality of positive lens components. The first lens group includes three lens groups with particular lens features, the first of which, from the object side, also includes two lens groups with particular features. Various combinations of lens elements satisfy two conditions for ratios of absolute values of focal lengths for the various combinations of lens elements that assist in achieving excellent imaging.

20 Claims, 8 Drawing Sheets

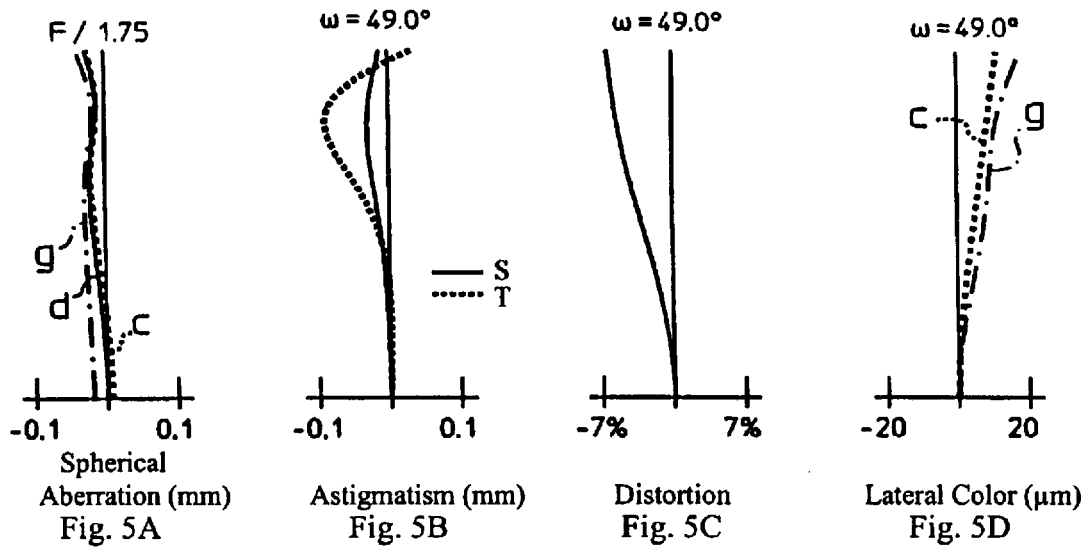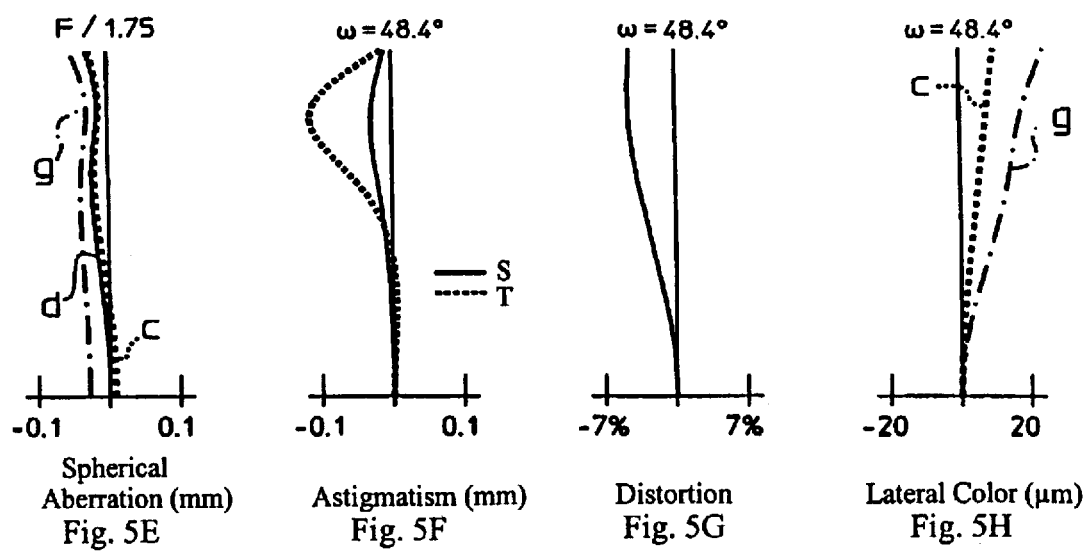

Spherical
Aberration (mm)

Astigmatism (mm)

Distortion

Lateral Color (μm)

Spherical
Aberration (mm)

Astigmatism (mm)

Distortion

Lateral Color (μm)

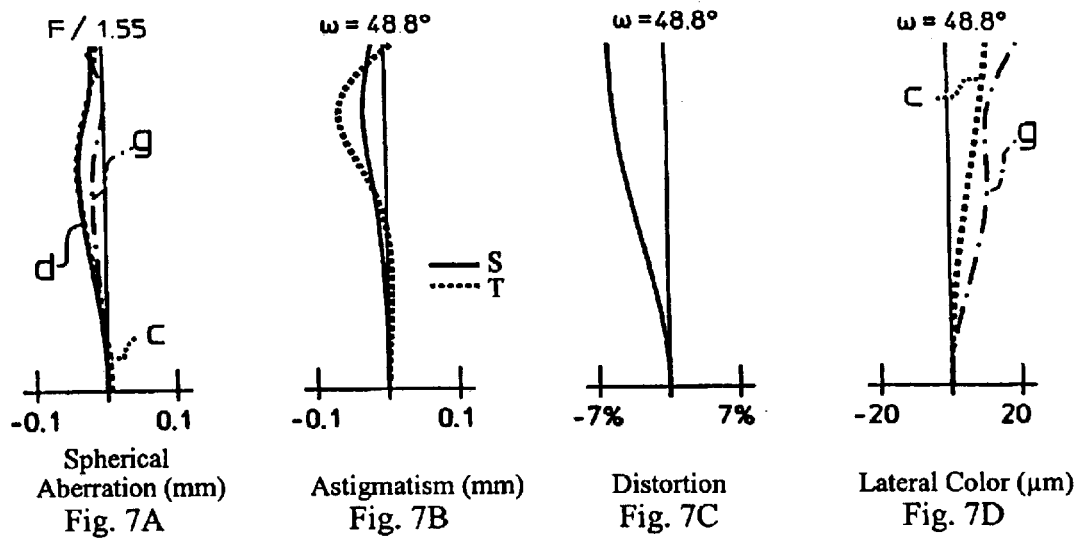
Fig. 7A Spherical Aberration (mm)
Fig. 7B Astigmatism (mm)
Fig. 7C Distortion
Fig. 7D Lateral Color (μm)
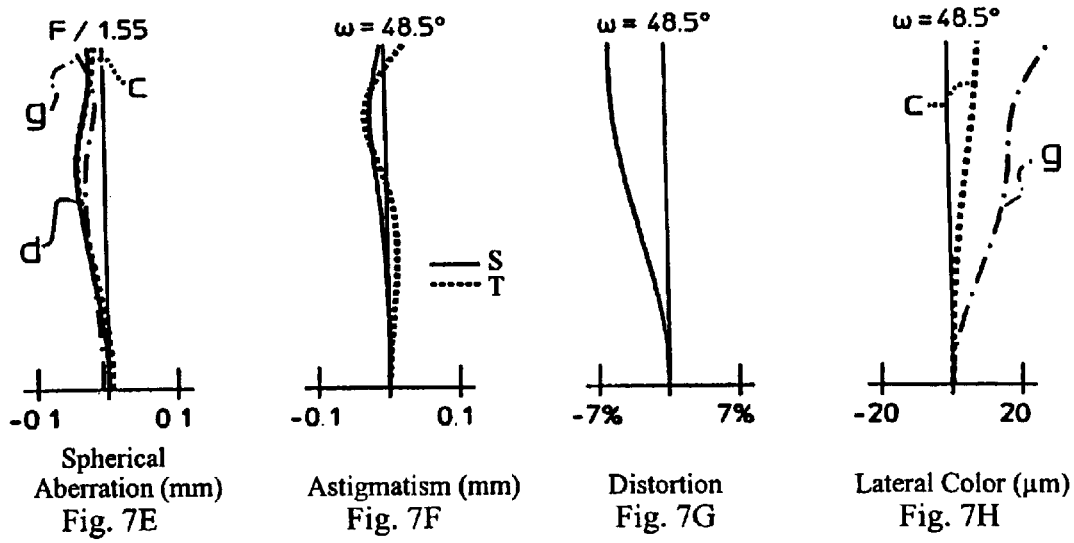
Fig. 7E Spherical Aberration (mm)
Fig. 7F Astigmatism (mm)
Fig. 7G Distortion
Fig. 7H Lateral Color (μm)

Spherical
Aberration (mm)

Astigmatism (mm)

Distortion

Lateral Color (μm)

Spherical
Aberration (mm)

Astigmatism (mm)

Distortion

Lateral Color (μm)

RETROFOCUS WIDE-ANGLE LENS

BACKGROUND OF THE INVENTION

Recently, an image pickup camera for broadcast TV, e.g., a so-called E cinema camera capable of recording an image for presentation on a cinema screen, has been developed. A wide-angle imaging lens used in an E cinema camera requires a wider angle and higher performance over the entire imaging plane than a common image pickup camera for broadcast TV.

Moreover, when a solid-state image pickup element is used in such an E cinema camera, similar to its use in a common image pickup camera for broadcast TV, a low-pass filter or an infrared rejecting filter may be provided between the imaging lens and the solid-state image pickup element, thereby requiring that the back focus of the imaging lens be extended. Furthermore, in a multiplate camera using an image pickup element for each primary color, a color separation prism is provided in front of each solid-state image pickup element, thereby requiring an even longer back focus of the imaging lens. Additionally, internal focusing is preferably used to reduce variations in aberrations and field angle usually associated with focusing in an image pickup camera for broadcast TV.

Japanese Laid-Open Patent Application H04-118612 discloses a retrofocus wide-angle lens that provides very good performance even when the field angle is 90° or more. However, the front lens group of that wide-angle lens is too large for the desired compactness of the image pickup camera. For example, in the wide-angle lens of Embodiment 1 of that application, with a focal length of 5.0 mm, an $F_{NO}$ of 1.8, and field angle of 95.5° (for an image circle of 11.0 mm), the optically effective diameter of the first lens group is 95 mm. However, there is a demand for making it about half that size.

Additionally, the wide-angle lens disclosed in Japanese Laid-Open Patent Application H04-118612 is constructed so that focusing is performed by moving lens components in both front and rear lens groups, which requires making complicated mechanisms for focusing. Furthermore, focusing causes significant variations in field angle, which is undesirable in E cinema cameras.

As mentioned above, internal focusing is used in order to reduce variations in aberrations and field angle with focusing. Besides the wide-angle lens disclosed in Japanese Laid-Open Patent Application H04-118612, Japanese Laid-Open Patent Application 2000-131606 discloses a similar wide-angle lens that uses internal focusing with a positive lens group and a negative lens group that are included within a first lens group. Focusing is achieved by moving the positive lens group that is on the image side of the negative lens group. However, for the wide-angle lens described, the ratio of back focus to the focal length of the entire wide-angle lens (i.e., the retrofocus ratio) is about 2.6, which is not always sufficient.

BRIEF SUMMARY OF THE INVENTION

The present invention relates to a high performance retrofocus wide-angle lens, suitable for TV-type cameras, and particularly relates to a high performance retrofocus wide-angle lens with a long back focus and with a relatively small optically effective diameter of the lens group at the object end of the retrofocus wide-angle lens that assists in obtaining the high compactness desired in that type of camera. Further, the present invention relates to such a high performance retrofocus wide-angle lens that reduces variations in aberrations and field angle with focusing and allows internal focusing with simple mechanisms. Thus the present invention is especially useful for broadcast TV cameras such as E cinema cameras.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 5A–5D show aberrations of Embodiment 1 of the retrofocus wide-angle lens of the present invention when focused at infinity;

FIGS. 5E–5H show aberrations of Embodiment 1 of the retrofocus wide-angle lens of the present invention when focused at a nearby object;

FIGS. 7A–7D show aberrations of Embodiment 3 of the retrofocus wide-angle lens of the present invention when focused at infinity;

FIGS. 7E–7H show aberrations of Embodiment 3 of the retrofocus wide-angle lens of the present invention when focused at a nearby object;

DETAILED DESCRIPTION OF THE INVENTION

First, definitions of the terms "lens element," "lens component," and "lens group," that relate to the following detailed description will be given. The term "lens element" is herein defined as a single transparent mass of refractive material having two opposed refracting surfaces, which surfaces are disposed at least generally transversely of the optical axis of the retrofocus wide-angle lens. The term "lens component" is herein defined as (a) a single lens element spaced so far from any adjacent lens element that the spacing cannot be neglected in computing the optical image forming properties of the lens elements or (b) as two or more lens elements that have their adjacent lens surfaces either in contact or so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Figure 1:
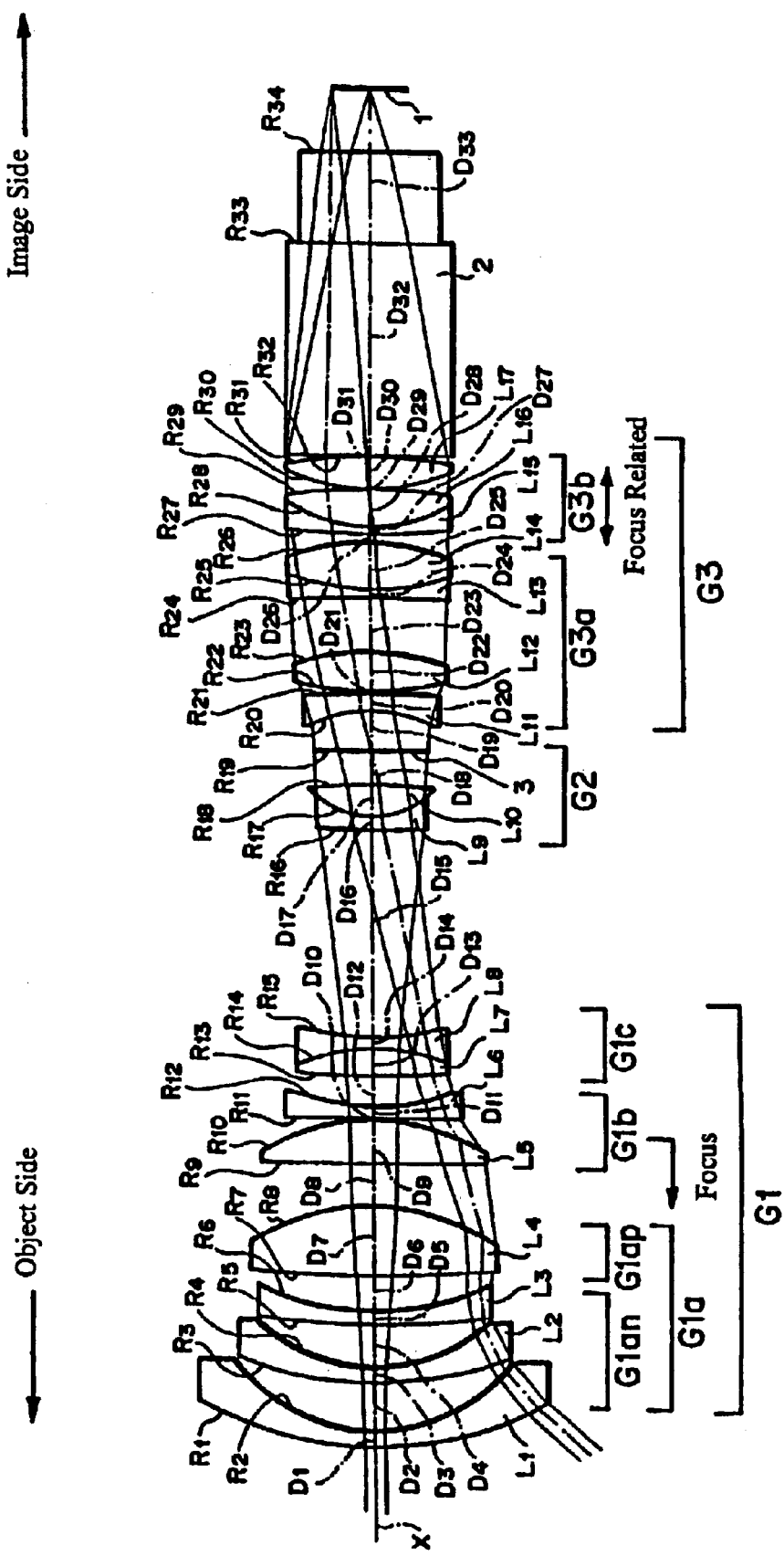
FIG. 1 shows a cross-sectional view of Embodiment 1 of the retrofocus wide-angle lens of the present invention.

A general description of the retrofocus wide-angle lens that pertains to all four embodiments of the invention will first be described, primarily with reference to FIG. 1 that shows Embodiment 1. In FIG. 1 (and FIGS. 2–4 that follow) lens elements are referenced by the letter L with a subscript denoting their order from the object side of the retrofocus wide-angle lens, from $L_1$ up to a maximum of $L_{18}$. Similarly, the radii of curvature of all the refractive surfaces are referenced by the letter R with a subscript denoting their order from the object side, from $R_1$ up to a maximum of $R_{35}$. The on-axis surface spacings (along the optical axis X of the figures) of all the optical surfaces are referenced by the letter D with a subscript denoting their order from the object side, from $D_1$ up to a maximum of $D_{34}$. The major lens groups are labeled G1 through G3 in order from the object side, and alphabetical order subscripts a, b, and c are added for lens groups divided from those lens groups, for example, lens groups G1*a*, G1*b*, and G1*c*, in their order from the object side. Additionally, lens group G1*a* is divided into a negative wide-angle lens group G1*an* and a positive converging lens group G1*ap*. Directional arrows in FIGS. 1–4 indicate possible movement by lens groups G1*b* and G3*b* relative to other lens groups.

The retrofocus wide-angle lens of the present invention is formed of, in order from the object side, a first lens group G1 having negative refractive power as a whole, a second lens group G2 that includes a stop 3 and at least one negative lens element and one positive lens element that are intimately bonded together and that are adjacent the stop, and a third lens group G3 having a positive refractive power as a whole. The term "intimately bonded together" is defined herein generally to mean that adjacent refractive surfaces of two lens elements have substantially the same curvature and are held in direct fixed contact or are separated by a thin layer of transparent adhesive (too thin to be considered in optical computations) that fixes the lenses together.

The first lens group G1 is arranged with plural negative lenses and plural positive lenses. The first lens group G1 includes, in order from the object side, a lens group G1*a* that includes at least one positive lens component and has a negative refractive power as a whole, a first another lens group G1*b* that includes at least one positive lens component and at least one negative lens component and has a negative refractive power as a whole, and a second another lens group G1*c* that includes at least one positive lens element and one negative lens element, in that order from the object side, that are intimately bonded together. Focusing of the retrofocus wide-angle lens is achieved generally by moving the lens group G1*b* along the optical axis X toward the object side during focusing from infinity to a nearby object. Moving only the interior lens group G1*b* for focusing allows a simple mechanism for focusing that reduces production costs, as well as reducing variations in aberrations and field angle with focusing.

Preferably, lens group G1*a* of the first lens group G1 includes, in order from the object side, a wide-angle related lens group G1*an* that includes at least two negative lens components and a wide-angle receiving related lens group G1*ap* that includes at least one positive lens component. In fact, in Embodiments 1–4 of the invention that follow, the wide-angle related lens group G1*an* includes three negative lens components. The three negative lens components provide a wide-angle view that the one or more positive lenses that follow help to direct along the optical axis X. That arrangement enables a wide-angle view while using a front lens component of relatively small optically effective diameter for an overall compact lens design.

Further, preferably the following condition is satisfied:

$$0.27 \leq |flan/flap| \leq 0.45 \qquad \text{Condition (1)}$$

where flan is the focal length of the wide-angle related lens group; and flap is the focal length of the wide-angle receiving related lens group.

If the above ratio of focal lengths is less than the lower limit of Condition (1), variations in coma and distortion become too great with focusing. On the other hand, if the above ratio of focal lengths exceeds the upper limit of Condition (1), varying field angle and associated excessive variations in coma occur with focusing.

Preferably also, the following condition is satisfied:

$$1.5 \leq |flbp/flbn| \leq 3.5 \qquad \text{Condition (2)}$$

where flbp is the focal length of the positive lens component of the first another lens group G1*b* that is nearest the object side, or is the combined focal length of a plurality of adjacent positive lens components of the first another lens group G1*b*; and flbn is the focal length of the negative lens components of the first another lens group G1*b* that is nearest the image side, or is the combined focal length of a plurality of adjacent negative lens components of the first another lens group G1*b*.

If the above ratio of focal lengths is less than the lower limit of Condition (2), variations in coma become too great with focusing. On the other hand, if the above ratio of focal lengths exceeds the upper limit of Condition (2), varying field angle and associated excessive variations in coma occur with focusing.

In all the disclosed lens Embodiments, the first lens group G1 includes eight lens elements, $L_1$–$L_8$, and the second another lens group G1*c* includes the seventh lens component $L_7$, which is a biconvex lens element with the lens surface of greater curvature on the image side and is intimately bonded to the eighth lens component $L_8$, which is a biconcave lens element with the lens surface of greater curvature on the object side, except for Embodiment 2. In Embodiment 2 the lens surface of greater curvature of the biconcave lens element is on the image side. Additionally, the second lens group G2 (for all embodiments) includes a ninth lens element $L_9$, which is a negative meniscus lens element with its concave lens surface on the image side, that is intimately bonded to a tenth lens $L_{10}$, which is a biconvex lens element with its lens surface of greater curvature on the object side.

Additionally, preferably the third lens group G3 includes, in order from the object side, an infinity related lens group G3a constructed and arranged so that the combined focal length of the first lens group G1, the second lens group G2, and the lens group G3a is nearly infinity, and a focusing related lens group G3b that is movable along the optical axis X to adjust the back focus of the retrofocus wide-angle lens. By that construction, mechanical errors in alignment of the optical axis produced by connecting the wide-angle lens to a camera body can be easily rectified without complicated mechanics.

As shown in FIG. 1, a beam incident on the retrofocus wide-angle lens is imaged on an image plane 1 of an image pickup element. The image pickup element is one of three that receive light via a three-color separation optical system 2 that may include a low-pass filter.

The retrofocus wide-angle lens of the invention has a long back focal length, thereby providing substantial space where other optical components may be placed ahead of an image plane, such as image plane 1, or image planes where one or more image pickup devices, provided in a housing with the retrofocus wide-angle lens, may detect the real image or real images for transmission, display, or recording.

Four embodiments of the present invention will now be individually described with further reference to the drawings.

Embodiment 1

FIG. 1 shows the basic lens element configuration and lens group positions of the retrofocus wide-angle lens of Embodiment 1. As shown in FIG. 1, lens group G1a of the first lens group G1 includes a wide-angle related lens group G1an that includes a first lens component $L_1$, a second lens component $L_2$, and a third lens component $L_3$ that is a negative meniscus lens element with its concave lens surface on the image side of the retrofocus wide-angle lens. Lens group G1a further includes a wide-angle receiving related lens group G1ap that includes a fourth lens component $L_4$ that is a biconvex lens component with the lens surface of greater curvature on the image side. Additionally, lens group G1b, which is a focusing lens group, includes a fifth lens component $L_5$ that includes a positive meniscus lens element with its convex lens surface on the image side and a sixth lens component $L_6$ that includes a biconcave lens element with the lens surface of greater curvature on the image side.

An infinity related lens group G3a of the third lens group G3 includes an eleventh lens component $L_{11}$, which is a negative meniscus lens element with its concave surface on the object side, a twelfth lens component $L_{12}$, which includes a biconvex lens element, and a thirteenth biconcave lens component $L_{13}$ with its lens surface of greater curvature on the image side and intimately bonded to a convex lens surface of a biconvex lens component $L_{14}$.

A focusing related lens group G3b, which is a back focus adjustment lens group, includes a fifteenth lens component $L_{15}$, which includes a negative meniscus lens with a concave lens surface on the image side intimately bonded to the convex lens surface of greater curvature of a biconvex sixteenth lens component $L_{16}$, and a seventeenth lens component $L_{17}$, which is a biconvex lens element with its lens surface of greater curvature on the object side.

Table 1 below lists the surface number #, in order from the object side, the radius of curvature R (in mm) of each surface near the optical axis, the on-axis surface spacing D (in mm), as well as the refractive index $N_d$ and the Abbe number $v_d$ (at the d line) of each lens element for Embodiment 1. Listed in the middle of Table 1 are the focal length f, the back focal length Bf, and the f-number $F_{NO}$ for Embodiment 1. Furthermore, listed in the bottom portion of the Table 1 are the values corresponding to Conditions (1) and (2) for Embodiment 1.

TABLE 1

| # | R | D | $N_d$ | $v_d$ |
|---|---|---|---|---|
| 1 | 50.806 | 2.00 | 1.74319 | 49.3 |
| 2 | 23.515 | 7.32 | | |
| 3 | 50.506 | 1.90 | 1.80400 | 46.6 |
| 4 | 22.567 | 7.00 | | |
| 5 | 133.395 | 1.80 | 1.72915 | 54.7 |
| 6 | 34.394 | 5.72 | | |
| 7 | 155.694 | 10.38 | 1.49700 | 81.5 |
| 8 | −31.152 | 7.00 | | |
| 9 | −3948.570 | 6.44 | 1.48749 | 70.2 |
| 10 | −28.970 | 0.20 | | |
| 11 | −897.003 | 1.70 | 1.88299 | 40.7 |
| 12 | 29.996 | 4.41 | | |
| 13 | 94.999 | 4.00 | 1.80517 | 25.4 |
| 14 | −25.280 | 2.00 | 1.77250 | 49.6 |
| 15 | 41.209 | 31.50 | | |
| 16 | 87.191 | 2.00 | 1.72915 | 54.7 |
| 17 | 10.999 | 5.24 | 1.64769 | 33.8 |
| 18 | −82.613 | 5.40 | | |
| 19 | ∞ (stop) | 6.00 | | |
| 20 | −20.282 | 3.00 | 1.81600 | 46.6 |
| 21 | −164.376 | 0.20 | | |
| 22 | 42.223 | 6.11 | 1.51633 | 64.1 |
| 23 | −30.711 | 8.00 | | |
| 24 | −424.839 | 1.30 | 1.88299 | 40.7 |
| 25 | 33.330 | 7.08 | 1.49700 | 81.5 |
| 26 | −28.278 | 1.00 | | |
| 27 | 96.119 | 1.30 | 1.88299 | 40.7 |
| 28 | 22.607 | 5.71 | 1.48749 | 70.2 |
| 29 | −63.887 | 0.12 | | |
| 30 | 27.654 | 4.89 | 1.48749 | 70.2 |
| 31 | −65.160 | 0.00 | | |
| 32 | ∞ | 33.00 | 1.60859 | 46.4 |
| 33 | ∞ | 13.20 | 1.51680 | 64.1 |
| 34 | ∞ | 9.62 | | | f = 5.10    Bf = 38.82    $F_{NO}$ = 1.75

Condition (1) value: |flan/flap| = 0.31126    (flan = −16.5623, flap = 53.21053)
Condition (2) value: |flbp/flbn| = 1.8    (flbp = 59.8, flbn = −32.8)

As Table 1 shows, both Conditions (1) and (2) are satisfied by Embodiment 1. In Embodiment 1, the optically effective diameter of the front lens group G1 is 50.0 mm, which provides for a high compactness of the retrofocus wide-angle lens.

FIGS. 5A–5D show the spherical aberration, astigmatism, distortion, and lateral color, respectively, of the retrofocus wide-angle lens of Embodiment 1 at infinity focus. FIGS. 5E–5H show the spherical aberration, astigmatism, distortion, lateral color, respectively, of the retrofocus wide-angle lens of Embodiment 1 at a nearby focus of 300 mm from the first lens group G1, which requires movement of the focusing lens group G1b a distance of 1.31 mm toward the object side. In FIGS. 5A and 5E, the spherical aberration is shown for the wavelengths 587.6 nm (the d-line), 656.3 nm (the C-line), and 436 nm (the g-line). In FIGS. 5B and 5F, the astigmatism is shown for both the sagittal image surface S and the tangential image surface T. In FIGS. 5D and 5H, the lateral color is shown for the wavelengths 656.3 nm (the C-line), and 436 nm (the g-line). In the remaining figures, the aberrations illustrated are for the d line, and ω is the half-picture angle. As is apparent from these figures, the various aberrations are favorably corrected.

Embodiment 2

Figure 2:
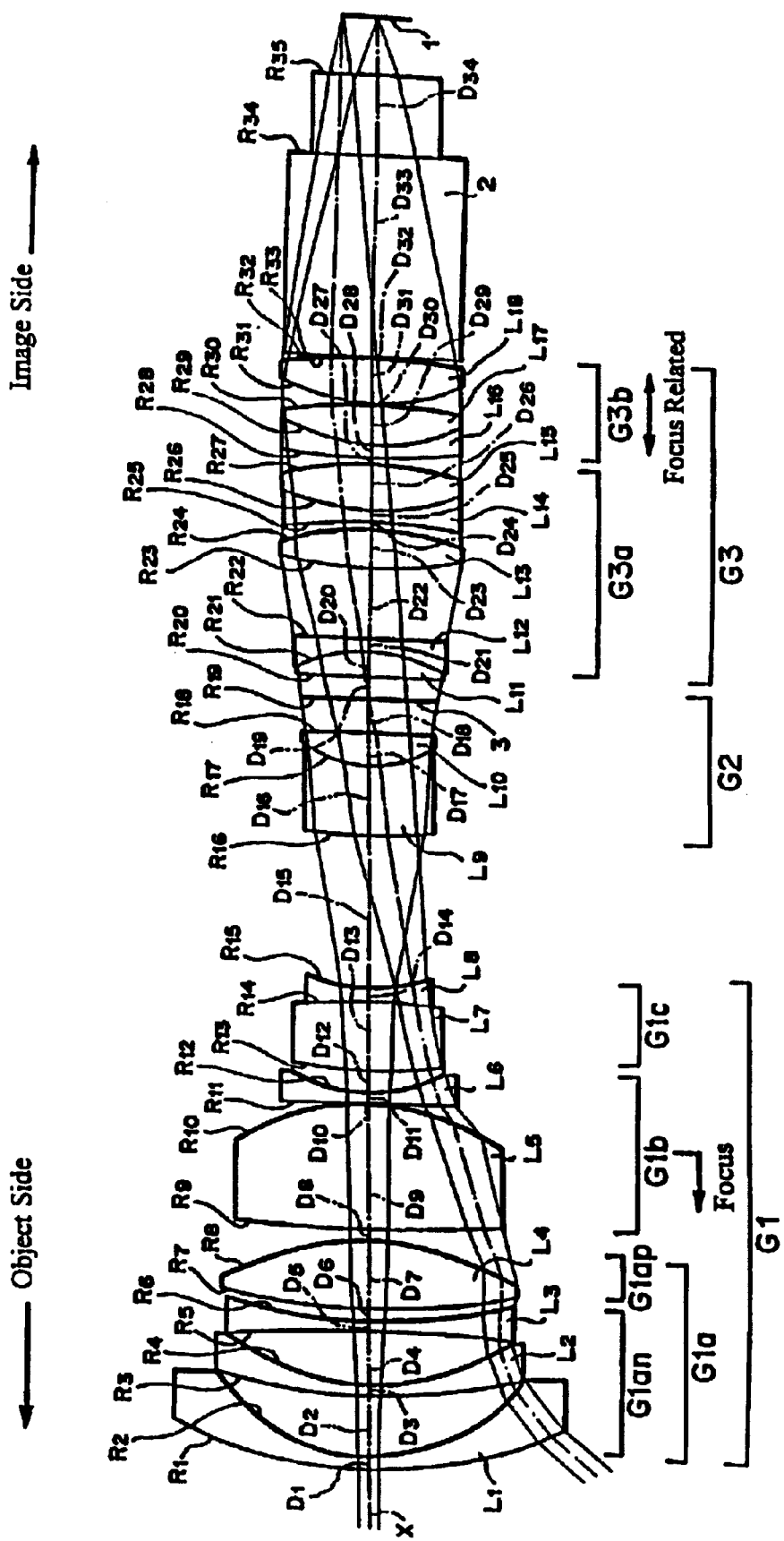
FIG. 2 shows a cross-sectional view of Embodiment 2 of the retrofocus wide-angle lens of the present invention.

FIG. 2 shows the basic lens element configuration and lens group positions of the retrofocus wide-angle lens of Embodiment 2. Because Embodiment 2 is very similar to Embodiment 1, primarily only the differences between Embodiment 2 and Embodiment 1 will be explained. One major difference between Embodiment 2 and Embodiment 1 is that, in Embodiment 2, the third lens $L_3$ of lens group G1$a$ is a biconcave lens with its lens surface of greater curvature on the image side of the retrofocus wide-angle lens. Additionally, infinity related lens group G3$a$ of the third lens group G3 includes five lens elements $L_{11}$–$L_{15}$.

Table 2 below lists the surface number #, in order from the object side, the radius of curvature R (in mm) of each surface near the optical axis, the on-axis surface spacing D (in mm), as well as the refractive index $N_d$ and the Abbe number $v_d$ (at the d line) of each lens element for Embodiment 2. Listed in the middle of Table 2 are the focal length f, the back focal length Bf, and the f-number $F_{NO}$ for Embodiment 2. Furthermore, listed in the bottom portion of the Table 2 are the values corresponding to Conditions (1) and (2) for Embodiment 2.

TABLE 2

| # | R | D | $N_d$ | $v_d$ |
|---|---|---|---|---|
| 1 | 65.431 | 2.00 | 1.88299 | 40.7 |
| 2 | 28.335 | 10.19 | | |
| 3 | 84.690 | 1.90 | 1.81600 | 46.6 |
| 4 | 35.834 | 8.69 | | |
| 5 | −354.748 | 1.80 | 1.81600 | 46.6 |
| 6 | 83.241 | 2.20 | | |
| 7 | 110.758 | 10.77 | 1.68893 | 31.1 |
| 8 | −45.664 | 1.75 | | |
| 9 | 246.532 | 20.21 | 1.45000 | 66.9 |
| 10 | −37.692 | 0.12 | | |
| 11 | 1542.514 | 1.70 | 1.86645 | 40.4 |
| 12 | 21.522 | 3.58 | | |
| 13 | 59.891 | 12.01 | 1.75942 | 27.1 |
| 14 | −92.732 | 2.00 | 1.63614 | 59.7 |
| 15 | 24.463 | 25.84 | | |
| 16 | 97.604 | 11.28 | 1.72915 | 54.7 |
| 17 | 16.858 | 5.88 | 1.59270 | 35.3 |
| 18 | −186.354 | 5.40 | | |
| 19 | ∞ (stop) | 4.00 | | |
| 20 | ∞ | 4.00 | 1.59551 | 39.2 |
| 21 | −23.664 | 2.00 | 1.58913 | 61.1 |
| 22 | ∞ | 11.65 | | |
| 23 | 53.344 | 7.17 | 1.48749 | 70.2 |
| 24 | −36.579 | 1.00 | | |
| 25 | −76.885 | 2.00 | 1.88299 | 40.7 |
| 26 | 33.714 | 8.00 | 1.49700 | 81.5 |
| 27 | −48.224 | 1.00 | | |
| 28 | 92.851 | 2.00 | 1.88299 | 40.7 |
| 29 | 28.806 | 7.00 | 1.49700 | 81.5 |
| 30 | −74.970 | 0.12 | | |
| 31 | 31.041 | 7.50 | 1.48749 | 70.2 |
| 32 | −93.158 | 0.00 | | |
| 33 | ∞ | 33.00 | 1.60859 | 46.4 |
| 34 | ∞ | 13.20 | 1.51680 | 64.1 |
| 35 | ∞ | 9.62 | | | f = 5.10   Bf = 38.82   $F_{NO}$ = 1.55

Condition (1) value: |flan/flap| = 0.40984   (flan = −19.7909, flap = 48.28967)
Condition (2) value: |flbp/flbn| = 2.9   (flbp = 74.3, flbn = −25.2)

As Table 2 shows, both Conditions (1) and (2) are satisfied by Embodiment 2.

In Embodiment 2, the optically effective diameter of the front lens group G1 is 61.6 mm, which provides for a high compactness of the retrofocus wide-angle lens.

Figure 6A:
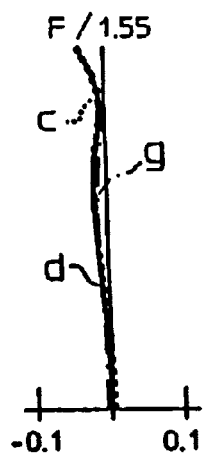
FIGS. 6A–6D show aberrations of Embodiment 2 of the retrofocus wide-angle lens of the present invention when focused at infinity.
Figure 6B:
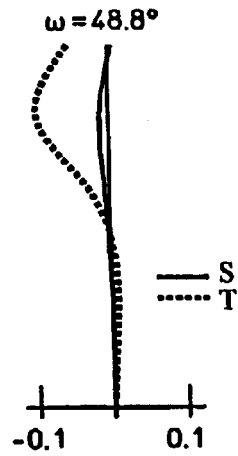
Figure 6C:
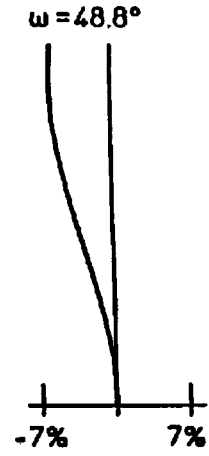
Figure 6D:
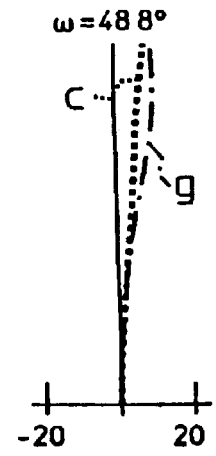
Figure 6E:
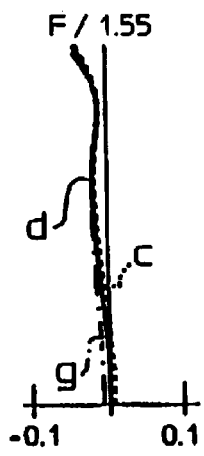
FIGS. 6E–6H show aberrations of Embodiment 2 of the retrofocus wide-angle lens of the present invention when focused at a nearby object.
Figure 6F:
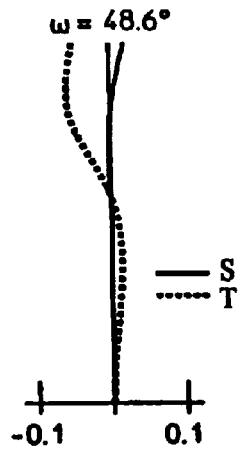
Figure 6G:
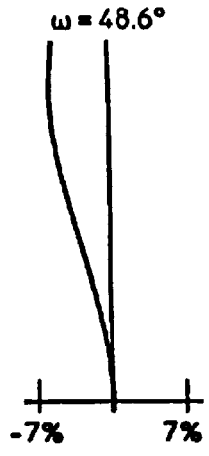
Figure 6H:
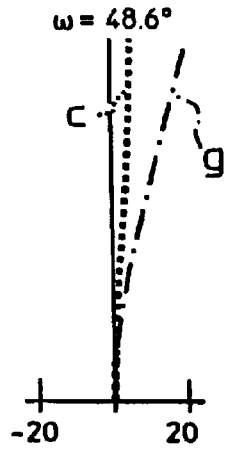

FIGS. 6A–6D show the spherical aberration, astigmatism, distortion, and lateral color, respectively, of the retrofocus wide-angle lens of Embodiment 2 at infinity focus. FIGS. 6E–6H show the spherical aberration, astigmatism, distortion, lateral color, respectively, of the retrofocus wide-angle lens of Embodiment 2 at a nearby range focus of 300 mm from the first lens group G1, which requires movement of the focusing lens group G1$b$ a distance of 0.77 mm toward the object side. In FIGS. 6A and 6E, the spherical aberration is shown for the wavelengths 587.6 nm (the d-line), 656.3 nm (the C-line), and 436 nm (the g-line). In FIGS. 6B and 6F, the astigmatism is shown for both the sagittal image surface S and the tangential image surface T. In FIGS. 6D and 6H, the lateral color is shown for the wavelengths 656.3 nm (the C-line), and 436 nm (the g-line). In the remaining figures, the aberrations illustrated are for the d line, and ω is the half-picture angle. As is apparent from these figures, the various aberrations are favorably corrected.

Embodiment 3

Figure 3:
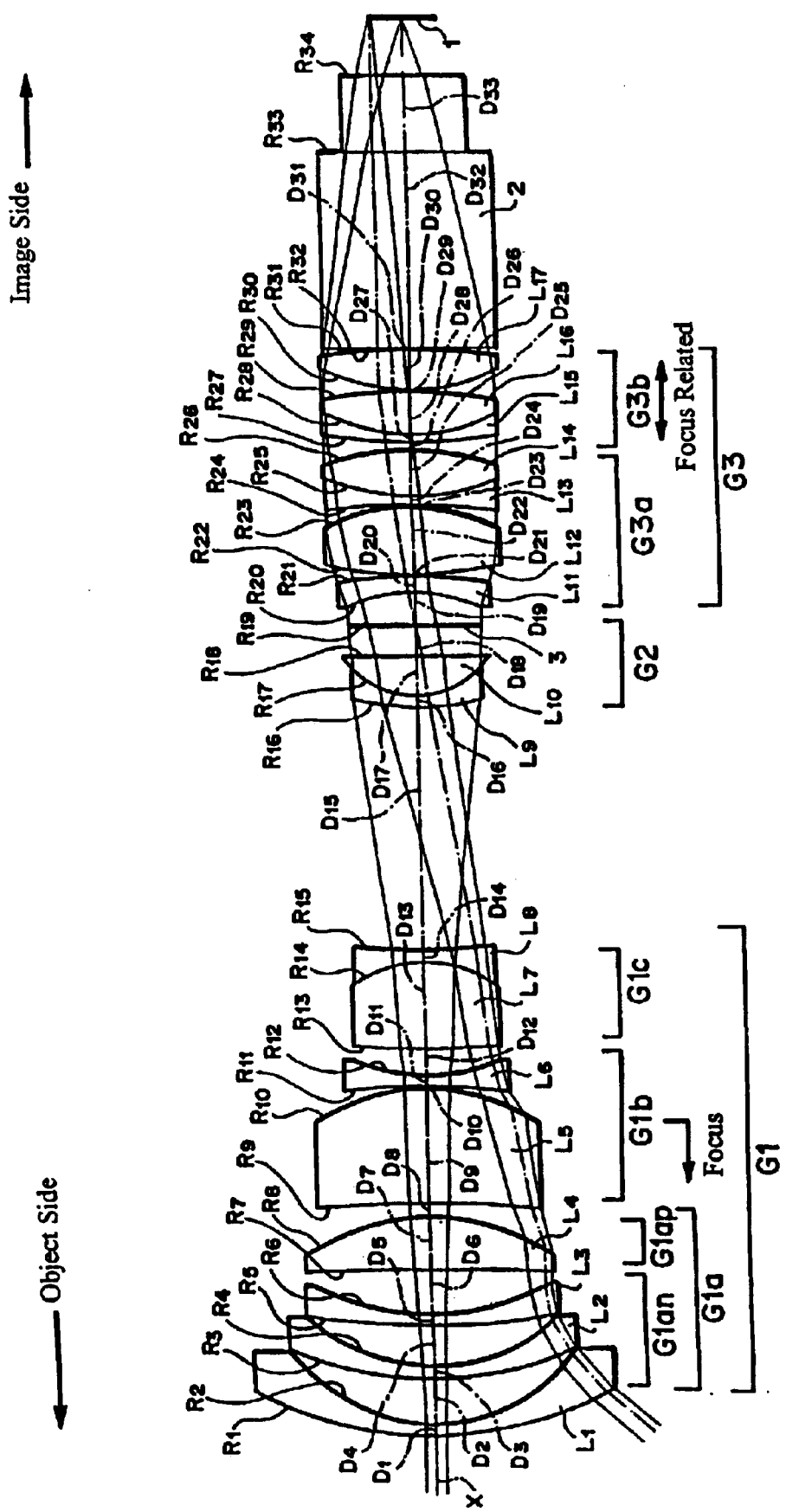
FIG. 3 shows a cross-sectional view of Embodiment 3 of the retrofocus wide-angle lens of the present invention.

FIG. 3 shows the basic lens element configuration and lens group positions of the retrofocus wide-angle lens of Embodiment 3. Because Embodiment 3 is very similar to Embodiment 1, primarily only differences between Embodiment 3 and Embodiment 1 will be explained. One major difference between Embodiment 3 and Embodiment 1 is that, in Embodiment 3, the fourth lens $L_4$, which is the last lens component on the image side of the lens group G1$a$ of the first lens group G1 is a positive meniscus lens element with its convex lens surface on the image side.

Table 3 below lists the surface number #, in order from the object side, the radius of curvature R (in mm) of each surface near the optical axis, the on-axis surface spacing D (in mm), as well as the refractive index $N_d$ and the Abbe number $v_d$ (at the d line) of each lens element for Embodiment 3. Listed in the middle of Table 3 are the focal length f, the back focal length Bf, and the f-number $F_{NO}$ for Embodiment 3. Furthermore, listed in the bottom portion of the Table 3 are the values corresponding to Conditions (1) and (2) for Embodiment 3.

TABLE 3

| # | R | D | $N_d$ | $v_d$ |
|---|---|---|---|---|
| 1 | 55.538 | 2.00 | 1.74319 | 49.3 |
| 2 | 27.343 | 7.79 | | |
| 3 | 54.534 | 1.90 | 1.80400 | 46.6 |
| 4 | 28.075 | 7.16 | | |
| 5 | 109.549 | 1.80 | 1.72915 | 54.7 |
| 6 | 39.127 | 7.50 | | |
| 7 | −960.816 | 8.78 | 1.49700 | 81.5 |
| 8 | −34.883 | 2.40 | | |
| 9 | −264.758 | 19.25 | 1.48749 | 70.2 |
| 10 | −31.924 | 0.20 | | |
| 11 | −149.962 | 1.70 | 1.88299 | 40.7 |
| 12 | 27.367 | 4.41 | | |
| 13 | 120.553 | 14.71 | 1.80517 | 25.4 |
| 14 | −19.708 | 2.00 | 1.77250 | 49.6 |
| 15 | 101.355 | 41.69 | | |
| 16 | 39.612 | 2.00 | 1.72915 | 54.7 |
| 17 | 13.903 | 6.66 | 1.59270 | 35.3 |
| 18 | 1081.697 | 5.40 | | |
| 19 | ∞ (stop) | 6.00 | | |
| 20 | −23.835 | 3.00 | 1.81600 | 46.6 |
| 21 | −70.108 | 0.20 | | |
| 22 | 59.437 | 11.58 | 1.51633 | 64.1 |
| 23 | −28.560 | 0.12 | | |
| 24 | −134.046 | 1.30 | 1.88299 | 40.7 |
| 25 | 33.259 | 8.00 | 1.49700 | 81.5 |

TABLE 3-continued

| # | R | D | $N_d$ | $v_d$ |
|---|---|---|---|---|
| 26 | −38.655 | 1.00 | | |
| 27 | 85.162 | 1.30 | 1.88299 | 40.7 |
| 28 | 27.561 | 7.50 | 1.48749 | 70.2 |
| 29 | −66.793 | 0.12 | | |
| 30 | 30.953 | 7.00 | 1.48749 | 70.2 |
| 31 | −105.544 | 0.00 | | |
| 32 | ∞ | 33.00 | 1.60859 | 46.4 |
| 33 | ∞ | 13.20 | 1.51680 | 64.1 |
| 34 | ∞ | 9.62 | | | f = 5.11    Bf = 38.82    $F_{NO}$ = 1.55
Condition (1) value:  |flan/flap| = 0.31116    (flan = −22.5912, flap = 72.60359)
Condition (2) value:  |flbp/flbn| = 2.8    (flbp = 72.5, flbn = −26.1)

As Table 3 shows, both Conditions (1) and (2) are satisfied by Embodiment 3.

In Embodiment 3, the effective diameter of the front lens group G1 is 58.0 mm, which provides for a high compactness of the retrofocus wide-angle lens.

FIGS. 7A–7D show the spherical aberration, astigmatism, distortion, and lateral color, respectively, of the retrofocus wide-angle lens of Embodiment 3 at infinity focus. FIGS. 7E–7H show the spherical aberration, astigmatism, distortion, lateral color, respectively, of the retrofocus wide-angle lens of Embodiment 3 at a nearby range focus of 300 mm from the first lens group G1, which requires movement of the focusing lens group G1b a distance of 0.62 mm toward the object side. In FIGS. 7A and 7E, the spherical aberration is shown for the wavelengths 587.6 nm (the d-line), 656.3 nm (the C-line), and 436 nm (the g-line). In FIGS. 7B and 7F, the astigmatism is shown for both the sagittal image surface S and the tangential image surface T. In FIGS. 7D and 7H, the lateral color is shown for the wavelengths 656.3 nm (the C-line), and 436 nm (the g-line). In the remaining figures, the aberrations illustrated are for the d line, and ω is the half-picture angle. As is apparent from these figures, the various aberrations are favorably corrected.

Embodiment 4

Figure 4:
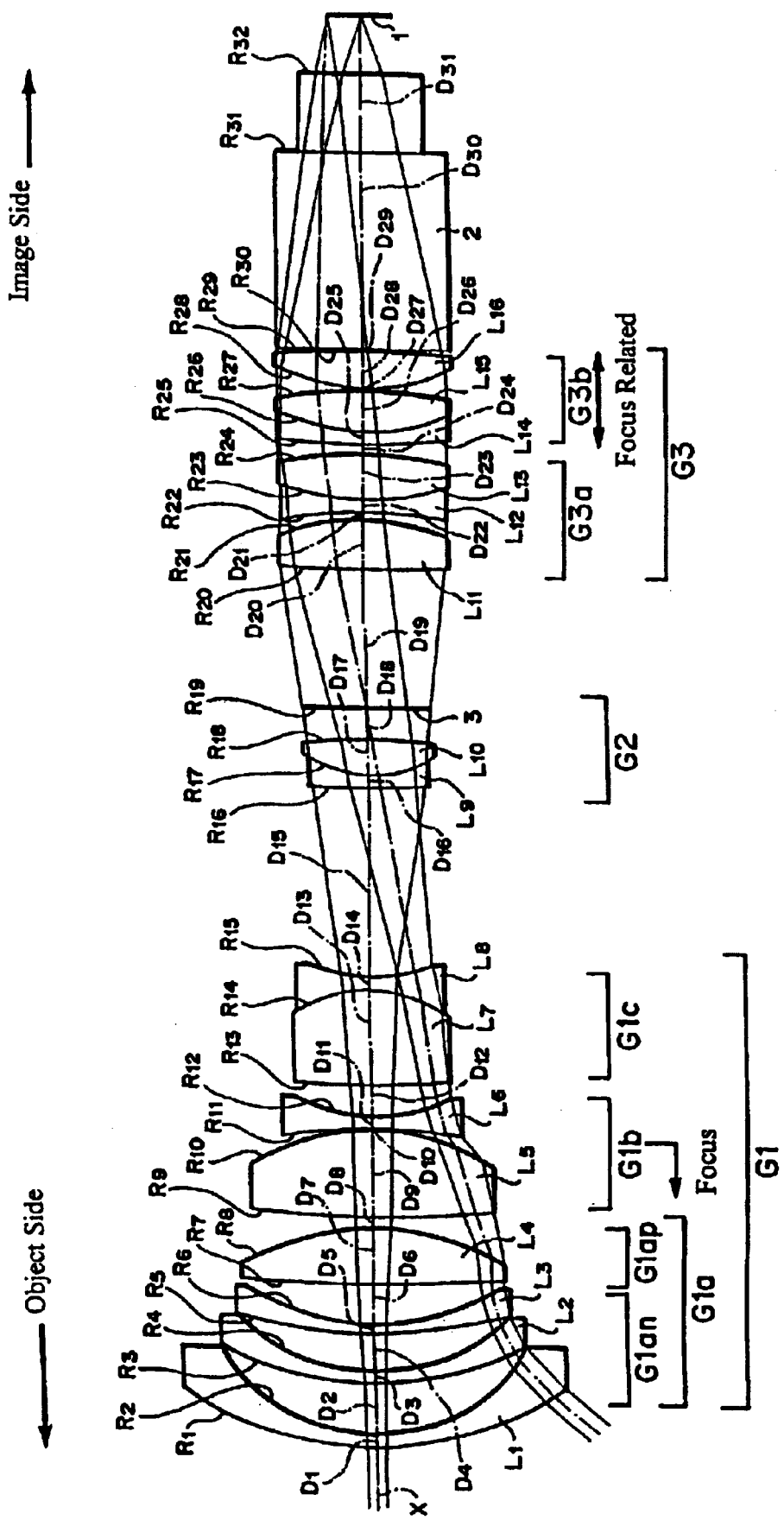
FIG. 4 shows a cross-sectional view of Embodiment 4 of the retrofocus wide-angle lens of the present invention.

FIG. 4 shows the basic lens element configuration and lens group positions of the retrofocus wide-angle lens of Embodiment 4. Because Embodiment 4 is very similar to Embodiment 1, primarily only differences between Embodiment 4 and Embodiment 1 will be explained for Embodiment 4. Major differences between Embodiment 4 and Embodiment 1 are that, in Embodiment 4, the fifth lens $L_5$, which is the first lens component on the object side of lens group G1b of the first lens group G1, is a biconvex lens element with its lens surface of greater curvature on the image side, and infinity related lens group G3a of the third lens group G3 is formed of only three lens elements, $L_{11}$–$L_{13}$.

Table 4 below lists the surface number #, in order from the object side, the radius of curvature R (in mm) of each surface near the optical axis, the on-axis surface spacing D (in mm), as well as the refractive index $N_d$ and the Abbe number $v_d$ (at the d line) of each lens element for Embodiment 4. Listed in the middle of Table 4 are the focal length f, the back focal length Bf, and the f-number $F_{NO}$ for Embodiment 4. Furthermore, listed in the bottom portion of the Table 4 are the values corresponding to Conditions (1) and (2) for Embodiment 4.

TABLE 4

| # | R | D | $N_d$ | $v_d$ |
|---|---|---|---|---|
| 1 | 51.631 | 2.00 | 1.88299 | 40.7 |
| 2 | 27.760 | 8.70 | | |
| 3 | 49.260 | 1.90 | 1.81600 | 46.6 |
| 4 | 30.557 | 6.37 | | |
| 5 | 74.057 | 1.80 | 1.81600 | 46.6 |
| 6 | 37.052 | 6.82 | | |
| 7 | 235.435 | 9.61 | 1.48749 | 70.2 |
| 8 | −40.203 | 2.05 | | |
| 9 | 203.085 | 14.45 | 1.48749 | 70.2 |
| 10 | −35.532 | 0.12 | | |
| 11 | −86.641 | 1.70 | 1.88299 | 40.7 |
| 12 | 25.267 | 5.07 | | |
| 13 | 101.753 | 16.08 | 1.72150 | 29.2 |
| 14 | −19.721 | 2.00 | 1.49700 | 81.5 |
| 15 | 23.119 | 32.69 | | |
| 16 | 136.138 | 1.96 | 1.72915 | 54.7 |
| 17 | 16.985 | 6.14 | 1.59270 | 35.3 |
| 18 | −94.538 | 5.40 | | |
| 19 | ∞ (stop) | 23.86 | | |
| 20 | 211.813 | 9.00 | 1.48749 | 70.2 |
| 21 | −32.152 | 1.00 | | |
| 22 | −92.782 | 2.00 | 1.88299 | 40.7 |
| 23 | 37.256 | 8.00 | 1.49700 | 81.5 |
| 24 | −53.375 | 1.00 | | |
| 25 | 93.692 | 2.00 | 1.88299 | 40.7 |
| 26 | 32.504 | 7.00 | 1.49700 | 81.5 |
| 27 | −74.126 | 0.12 | | |
| 28 | 30.818 | 6.50 | 1.48749 | 70.2 |
| 29 | −127.097 | 0.00 | | |
| 30 | ∞ | 33.00 | 1.60859 | 46.4 |
| 31 | ∞ | 13.20 | 1.51680 | 64.1 |
| 32 | ∞ | 9.61 | | | f = 5.10    Bf = 38.82    $F_{NO}$ = 1.60
Condition (1) value:  |flan/flap| = 0.35687    (flan = −25.4228, flap = 71.25632)
Condition (2) value:  |flbp/flbn| = 2.9    (flbp = 63.3, flbn = −22.0)

As Table 4 shows, both Conditions (1) and (2) are satisfied by Embodiment 4.

In Embodiment 4, the optically effective diameter of the front lens group G1 is 61.7 mm, which provides for a high compactness of the retrofocus wide-angle lens.

Figure 8A:
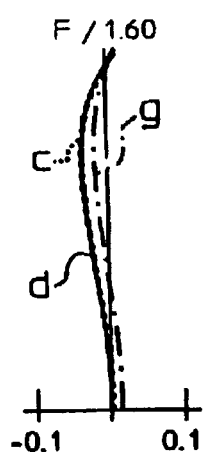
FIGS. 8A–8D show aberrations of Embodiment 4 of the retrofocus wide-angle lens of the present invention when focused at infinity.
Figure 8B:
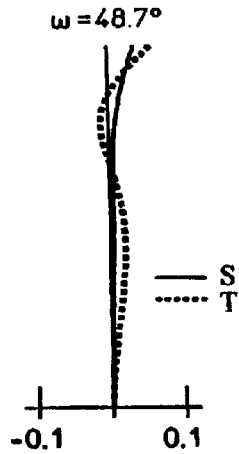
Figure 8C:
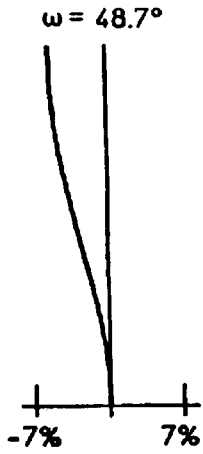
Figure 8D:
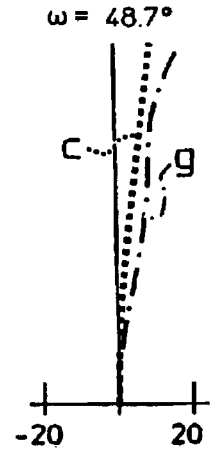
Figure 8E:
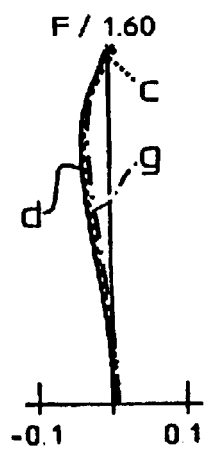
FIGS. 8E–8H show aberrations of Embodiment 4 of the retrofocus wide-angle lens of the present invention when focused at a nearby object.
Figure 8F:
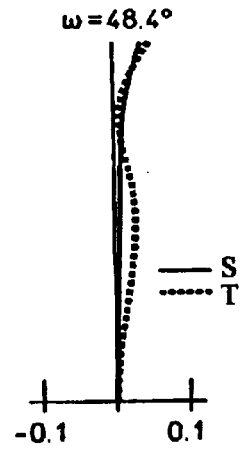
Figure 8G:
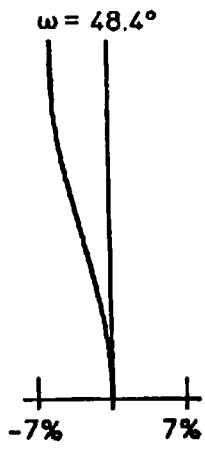
Figure 8H:
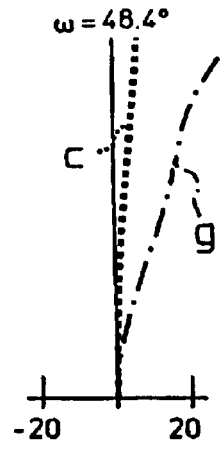

FIGS. 8A–8D show the spherical aberration, astigmatism, distortion, and lateral color, respectively, of the retrofocus wide-angle lens of Embodiment 4 at infinity focus. FIGS. 8E–8H show the spherical aberration, astigmatism, distortion, lateral color, respectively, of the retrofocus wide-angle lens of Embodiment 4 at a nearby range focus of 300 mm from the first lens group G1, which requires movement of the focusing lens group G1b a distance of 0.64 mm toward the object side. In FIGS. 8A and 8E, the spherical aberration is shown for the wavelengths 587.6 nm (the d-line), 656.3 nm (the C-line), and 436 nm (the g-line). In FIGS. 8B and 8F, the astigmatism is shown for both the sagittal image surface S and the tangential image surface T. In FIGS. 8D and 8H, the lateral color is shown for the wavelengths 656.3 nm (the C-line), and 436 nm (the g-line). In the remaining figures, the aberrations illustrated are for the d line, and ω is the half-picture angle. As is apparent from these figures, the various aberrations are favorably corrected.

The present invention is not limited to the aforementioned embodiments, as it will be obvious that various alternative implementations are possible. For instance, values such as the radius of curvature R of each of the lens components, the surface spacings D, the refractive index N, as well as the Abbe number $v_d$, are not limited to the examples indicated in each of the aforementioned embodiments, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A retrofocus wide-angle lens formed of only three lens groups, in order from the object side, a first lens group of negative refractive power, a second lens group that includes a stop, and a third lens group of positive refractive power; wherein said first lens group is at the object end of the retrofocus wide-angle lens and includes, in order from the object side, a plurality of negative lens components and a plurality of positive lens components, and said first lens group includes a lens group of negative refractive power that is at the object end of the first lens group and that includes said plurality of negative lens components and at least one of the plurality of positive lens components of said first lens group;

said first lens group further includes a first another lens group of negative refractive power that is on the image side of and adjacent to said lens group of negative refractive power that is at the object end of the first lens group, and said first another lens group includes at least one positive lens component;

said first lens group includes a second another lens group that is on the image side of and adjacent to said first another lens group, and said second another lens group includes, in order from the object side, a positive lens element and a negative lens element that are intimately bonded to one another; and said second lens group includes a lens component that is adjacent to said stop and that includes a positive lens element that is intimately bonded to a negative lens element.

2. The retrofocus wide-angle lens of claim 1, wherein moving said first another lens group within said first lens group toward the object side provides focusing from an object at infinity to a nearby object.

3. The retrofocus wide-angle lens of claim 1, wherein said lens group of negative refractive power that is at the object end of the first lens group includes two lens groups, in order from the object side, a wide-angle related lens group that includes a plurality of negative lens components and a wide-angle receiving related lens group that includes at least one positive lens component, and wherein the following condition is satisfied:

$$0.27 \leq |flan/flap| \leq 0.45$$

where flan is the focal length of said wide-angle related lens group, and flap is the focal length of said wide-angle receiving related lens group.

4. The retrofocus wide-angle lens of claim 2, wherein said lens group of negative refractive power that is at the object end of the first lens group includes two lens groups, in order from the object side, a wide-angle related lens group that includes a plurality of negative lens components and a wide-angle receiving related lens group that includes at least one positive lens component, and wherein the following condition is satisfied:

$$0.27 \leq |flan/flap| \leq 0.45$$

where flan is the focal length of said wide-angle related lens group, and flap is the focal length of said wide-angle receiving related lens group.

5. The retrofocus wide-angle lens of claim 1, wherein said first another lens group of negative refractive power includes, in order from the object side, at least one positive lens component and at least one negative lens component, and the following condition is satisfied:

$$1.5 \leq |flbp/flbn| \leq 3.5$$

where flbp is the focal length of the positive lens component of said first another lens group that is nearest the object side or is the combined focal length of a plurality of adjacent positive lens components of the first another lens group; and flbn is the focal length of the negative lens component of said first another lens group that is nearest the image side or is the combined focal length of a plurality of adjacent negative lens components of the first another lens group.

6. The retrofocus wide-angle lens of claim 2, wherein said first another lens group of negative refractive power includes, in order from the object side, at least one positive lens component and at least one negative lens component, and the following condition is satisfied:

$$1.5 \leq |flbp/flbn| \leq 3.5$$

where flbp is the focal length of the positive lens component of said first another lens group that is nearest the object side or is the combined focal length of a plurality of adjacent positive lens components of the first another lens group; and flbn is the focal length of the negative lens component of said first another lens group that is nearest the image side or is the combined focal length of a plurality of adjacent negative lens components of the first another lens group.

7. The retrofocus wide-angle lens of claim 3, wherein said first another lens group of negative refractive power includes, in order from the object side, at least one positive lens component and at least one negative lens component, and the following condition is satisfied:

$$1.5 \leq |flbp/flbn| \leq 3.5$$

where flbp is the focal length of the positive lens component of said first another lens group that is nearest the object side or is the combined focal length of a plurality of adjacent positive lens components of the first another lens group; and flbn is the focal length of the negative lens component of said first another lens group that is nearest the image side or is the combined focal length of a plurality of adjacent negative lens components of the first another lens group.

8. The retrofocus wide-angle lens of claim 4, wherein said first another lens group of negative refractive power includes, in order from the object side, at least one positive lens component and at least one negative lens component, and the following condition is satisfied:

$$1.5 \leq |flbp/flbn| \leq 3.5$$

where
- flbp is the focal length of the positive lens component of said first another lens group that is nearest the object side or is the combined focal length of a plurality of adjacent positive lens components of the first another lens group; and
- flbn is the focal length of the negative lens component of said first another lens group that is nearest the image side or is the combined focal length of a plurality of adjacent negative lens components of the first another lens group.

9. The retrofocus wide-angle lens of claim 1, wherein said third lens group includes, in order from the object side, an infinity related lens group and a focusing related lens group, and the combined focal length of said first lens group, said second lens group and said infinity related lens group is nearly infinity, and the back focal length of the retrofocus wide-angle lens is adjustable by moving the focusing related lens group along the optical axis.

10. The retrofocus wide-angle lens of claim 2, wherein said third lens group includes, in order from the object side, an infinity related lens group and a focusing related lens group, and the combined focal length of said first lens group, said second lens group and said infinity related lens group is nearly infinity, and the back focal length of the retrofocus wide-angle lens is adjustable by moving the focusing related lens group along the optical axis.

11. The retrofocus wide-angle lens of claim 3, wherein said third lens group includes, in order from the object side, an infinity related lens group and a focusing related lens group, and the combined focal length of said first lens group, said second lens group and said infinity related lens group is nearly infinity, and the back focal length of the retrofocus wide-angle lens is adjustable by moving the focusing related lens group along the optical axis.

12. The retrofocus wide-angle lens of claim 4, wherein said third lens group includes, in order from the object side, an infinity related lens group and a focusing related lens group, and the combined focal length of said first lens group, said second lens group and said infinity related lens group is nearly infinity, and the back focal length of the retrofocus wide-angle lens is adjustable by moving the focusing related lens group along the optical axis.

13. The retrofocus wide-angle lens of claim 5, wherein said third lens group includes, in order from the object side, an infinity related lens group and a focusing related lens group, and the combined focal length of said first lens group, said second lens group and said infinity related lens group is nearly infinity, and the back focal length of the retrofocus wide-angle lens is adjustable by moving the focusing related lens group along the optical axis.

14. The retrofocus wide-angle lens of claim 6, wherein said third lens group includes, in order from the object side, an infinity related lens group and a focusing related lens group, and the combined focal length of said first lens group, said second lens group and said infinity related lens group is nearly infinity, and the back focal length of the retrofocus wide-angle lens is adjustable by moving the focusing related lens group along the optical axis.

15. The retrofocus wide-angle lens of claim 7, wherein said third lens group includes, in order from the object side, an infinity related lens group and a focusing related lens group, and the combined focal length of said first lens group, said second lens group and said infinity related lens group is nearly infinity, and the back focal length of the retrofocus wide-angle lens is adjustable by moving the focusing related lens group along the optical axis.

16. The retrofocus wide-angle lens of claim 8, wherein said third lens group includes, in order from the object side, an infinity related lens group and a focusing related lens group, and the combined focal length of said first lens group, said second lens group and said infinity related lens group is nearly infinity, and the back focal length of the retrofocus wide-angle lens is adjustable by moving the focusing related lens group along the optical axis.

17. The retrofocus wide-angle lens of claim 1 in combination with a case in which the retrofocus wide-angle lens is housed.

18. The retrofocus wide-angle lens of claim 2 in combination with a case in which the retrofocus wide-angle lens is housed.

19. The retrofocus wide-angle lens of claim 3 in combination with a case in which the retrofocus wide-angle lens is housed.

20. The retrofocus wide-angle lens of claim 5 in combination with a case in which the retrofocus wide-angle lens is housed.

* * * * *